United States Patent
Ong et al.

(10) Patent No.: US 11,570,136 B2
(45) Date of Patent: Jan. 31, 2023

(54) WIRELESS EXTENSION OF BROADBAND ACCESS

(71) Applicant: Comcast Cable Communications, LLC, Philadelphia, PA (US)

(72) Inventors: Ivan Ong, Malvern, PA (US); Clifton Lowery, Philadelphia, PA (US); David Urban, Downingtown, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

(21) Appl. No.: 15/702,405

(22) Filed: Sep. 12, 2017

(65) Prior Publication Data

US 2018/0227268 A1   Aug. 9, 2018

Related U.S. Application Data

(63) Continuation of application No. 12/872,717, filed on Aug. 31, 2010, now Pat. No. 9,794,220.

(51) Int. Cl.
| | | |
|---|---|---|
| *H04L 61/251* | (2022.01) | |
| *H04W 4/50* | (2018.01) | |
| *H04L 61/5014* | (2022.01) | |
| *H04W 8/26* | (2009.01) | |
| *H04W 72/00* | (2009.01) | |
| *H04W 74/00* | (2009.01) | |

(52) U.S. Cl.
CPC ........ *H04L 61/251* (2013.01); *H04L 61/5014* (2022.05); *H04W 4/50* (2018.02); *H04W 8/26* (2013.01); *H04W 74/004* (2013.01)

(58) Field of Classification Search
CPC .......... H04L 29/12358; H04L 61/2015; H04L 61/251; H04L 61/5014; H04W 4/50; H04W 8/26; H04W 74/004
See application file for complete search history.

(56) References Cited

U.S. PATENT DOCUMENTS

| | | | |
|---|---|---|---|
| 7,013,303 | B2 | 3/2006 | Faybishenko et al. |
| 7,299,291 | B1 | 11/2007 | Shaw |
| 8,228,861 | B1 | 7/2012 | Nix |
| 8,254,930 | B1 | 8/2012 | Mauer et al. |
| 8,532,272 | B2 | 9/2013 | Francisco |
| 9,324,375 | B1 | 4/2016 | Casalena et al. |
| 9,794,220 | B2 | 10/2017 | Ong et al. |
| 9,854,297 | B2 | 12/2017 | Francisco |

(Continued)

FOREIGN PATENT DOCUMENTS

WO   200221841 A1   3/2002

OTHER PUBLICATIONS

U.S. Appl. No. 15/492,345, filed Apr. 20, 2017, Wireless Extension of Broadband Access.

(Continued)

*Primary Examiner* — Jianye Wu
(74) *Attorney, Agent, or Firm* — Banner & Witcoff, Ltd.

(57) ABSTRACT

Methods, systems, and apparatuses are described for extending a network through the use of access nodes. The access nodes may receive packets from user devices via wireless networks. The packets may be routed to a remote server for further network access. The access nodes may communicate with the user devices using network addresses associated with the wireless networks.

21 Claims, 3 Drawing Sheets

(56) References Cited

U.S. PATENT DOCUMENTS

| | | | |
|---|---|---|---|
| 2002/0095595 A1* | 7/2002 | Christopherson | H04L 67/42 726/4 |
| 2002/0172217 A1 | 11/2002 | Kadaba et al. | |
| 2003/0212764 A1 | 11/2003 | Trossen et al. | |
| 2003/0231861 A1 | 12/2003 | Yoo et al. | |
| 2004/0006708 A1* | 1/2004 | Mukherjee | H04L 63/0272 726/15 |
| 2004/0037260 A1* | 2/2004 | Kakemizu | H04L 63/0272 370/338 |
| 2004/0083295 A1* | 4/2004 | Amara | H04L 12/4645 709/229 |
| 2004/0103232 A1 | 5/2004 | Clayton | |
| 2004/0103282 A1 | 5/2004 | Meier et al. | |
| 2005/0074019 A1 | 4/2005 | Handforth et al. | |
| 2005/0235308 A1 | 10/2005 | Dellow et al. | |
| 2005/0265309 A1* | 12/2005 | Parandekar | H04L 12/2801 370/351 |
| 2006/0002370 A1* | 1/2006 | Rabie | H04L 47/2408 370/351 |
| 2006/0155835 A1* | 7/2006 | Forutanpour | G06F 16/40 709/223 |
| 2006/0193330 A1* | 8/2006 | Ishihara | H04L 29/12801 370/395.53 |
| 2006/0203736 A1* | 9/2006 | Molen | H04L 41/22 370/245 |
| 2006/0221897 A1 | 10/2006 | Nagy et al. | |
| 2007/0014259 A1 | 1/2007 | Fajardo et al. | |
| 2007/0025295 A1 | 2/2007 | Kono | |
| 2007/0147234 A1 | 6/2007 | Walter et al. | |
| 2007/0147401 A1 | 6/2007 | Carew et al. | |
| 2007/0223451 A1* | 9/2007 | Ren | H04W 40/14 370/352 |
| 2007/0248085 A1* | 10/2007 | Volpano | H04L 29/12028 370/389 |
| 2008/0043970 A1 | 2/2008 | Scholes et al. | |
| 2008/0043971 A1 | 2/2008 | Barchi | |
| 2008/0250010 A1 | 10/2008 | Rathod et al. | |
| 2008/0256255 A1 | 10/2008 | Mordovskoi et al. | |
| 2008/0305813 A1 | 12/2008 | Rao | |
| 2009/0089832 A1 | 4/2009 | Kendall | |
| 2009/0093264 A1 | 4/2009 | Heredia et al. | |
| 2009/0135843 A1 | 5/2009 | Veillette | |
| 2009/0234713 A1 | 9/2009 | Bi et al. | |
| 2010/0085948 A1* | 4/2010 | Yu | H04L 45/123 370/338 |
| 2010/0153985 A1 | 6/2010 | Dey | |
| 2011/0022711 A1* | 1/2011 | Cohn | H04L 41/04 709/225 |
| 2011/0091025 A1 | 4/2011 | Francisco | |
| 2011/0149720 A1* | 6/2011 | Phuah | H04L 43/0811 370/216 |
| 2012/0051341 A1 | 3/2012 | Ong et al. | |
| 2012/0278842 A1* | 11/2012 | Look | G11B 27/34 725/63 |
| 2014/0026170 A1 | 1/2014 | Francisco | |
| 2014/0040950 A1 | 2/2014 | Clemente | |

OTHER PUBLICATIONS

U.S. Appl. No. 15/816,390, filed Nov. 17, 2017, Service Entry Device.
EP 10187036.8, Office Action dated Jan. 17, 2012.
Saito T et al. "Home Gateway Architecture and its Implementation," IEEE Transactions on Consumer Electronics, IEEE Service Center, New York, NY, US vol. 46, No. 4.
EP 10187036.8, Search Report, completion date Jan. 14, 2011.
BP Tiwari: "Understanding WiMAX Network Architecture".
WiMAX Forum Network Architecture.
Samhat et a: "Security and AAA Architecture for WiFi-WiMAX Mesh Network".
EP 11179627.2 Partial EP Search Report dated Feb. 6, 2012.
BelAir Networks, Data Sheet, BelAir I 00S Strand-Mounted Wireless Multi-service Node, www.belairnetworks.com; BDMAI0020-B08, 2 pages.
BelAir Networks, Data Sheet, BelAir I 00T Wireless Mesh Node, www.belairnetworks.com; BDMAI500I-A0I, 2 pages.
Response to European Office Action—EP 10187036.8—dated May 28, 2015.
European Office Action—EP Appl. 10187036.8—dated Sep. 4, 2015.
European Office Action—EP Appl. 11179627.2—dated Feb. 2, 2016.
Canadian Office Action—CA App 2,716,911—dated Aug. 25, 2016.
Jun. 6, 2017—Canadian Office Action—CA 2,751,106.
Nov. 21, 2017—European Office Action—EP 11179627.2.
Jun. 20, 2018—Canadian Office Action—CA 2,751,106.
Mar. 1, 2019—Canadian Office Action—CA 2,716,911.
Jul. 22, 2019—Canadian Office Action—CA 2,751,106.
Nov. 19, 2020—Canadian Office Action—CA 2,751,106.
Aug. 10, 2022—CA Office Action—CA App. No. 2,751,106.

* cited by examiner

WIRELESS EXTENSION OF BROADBAND ACCESS

CROSS REFERENCE TO RELATED APPLICATIONS

This application is a continuation of, and claims priority to, U.S. patent application Ser. No. 12/872,717, filed Aug. 31, 2010, entitled "Wireless Extension of Broadband Access", the disclosure of which is incorporated by reference herein in its entirety and made part hereof.

FIELD OF ART

The features described herein generally relate to providing users with access to high speed data networks.

BACKGROUND

Today's high speed data connection is as important as yesteryear's dial tone. Just about every facet of life is now accessible and manageable via such a network, such as the Internet, and its importance is only going to grow over time as more and more devices become 'smart' and connected.

Reaching the network requires, of course, a data connection to a server that is on the Internet; be it via fiber optic cable, coaxial cable, wireless, satellite, cellular, or other network. And whichever network type is chosen for that data connection, there are invariably geographic areas that are not well covered by the network. For example, fiber optic and coaxial cable networks can only reach locations that have those underground cables. Digging up earth and laying those cables is an expensive task, and expansion of those networks is slow, so anyone who happens to be outside of the cable network's coverage area may be out of luck.

In many homes, local wireless access nodes (e.g., wireless "hotspots") can be installed to help extend the reach of the network to bedrooms, basements, etc. that are not within easy reach of the home' wiring outlets, but those are not a perfect solution either. Wireless access nodes often have a limited range that is only really suitable for indoor, same-premises deployment, and their decentralized nature can lead to maintenance difficulties as more and more homes deploy different kinds of wireless equipment from different vendors.

There is, and probably always will be, a need for an improvement in expanding network access to more and more locations.

SUMMARY

This summary is not intended to identify critical or essential features of the inventions claimed herein, but instead merely summarizes certain features and variations thereof.

In some embodiments, a wireless network provisioning server may be used to manage multiple wireless networks from multiple strand-mounted wireless access nodes located in multiple geographic neighborhoods. The various strand-mounted nodes may establish secure tunnel links with the provisioning server, and can use that tunnel to carry traffic to and from one or more consumer devices that are wirelessly connected to the access nodes.

The provisioning server may assign private network addresses to the various consumer devices, and the private addresses may be used within the networks managed by the server. External networks might not use the private addresses, and the server (or a different server) may convert between public and private addresses to support communications of the consumer devices.

In some embodiments, all wireless traffic from a consumer device may be funneled through a centralized wireless network management platform, which may perform the address conversion noted above.

In some embodiments, the strand-mounted access node may include multiple radio circuits, such as separate ones for access and mesh communications. The access radio may be used for communications between a consumer device and the node, while the mesh radio may be used for communications between the nodes. The mesh radio may use the same or different bandwidth protocols as that used by the access radios—in some embodiments the mesh radio may use a higher-bandwidth protocol.

A node may support multiple virtual wireless networks, and may allow different wireless network connections from different consumer devices. For this purpose, a given node may broadcast multiple different wireless network identifiers, and may tag network traffic with different virtual wireless network identifiers based on the virtual network to which the consumer device is connected.

Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
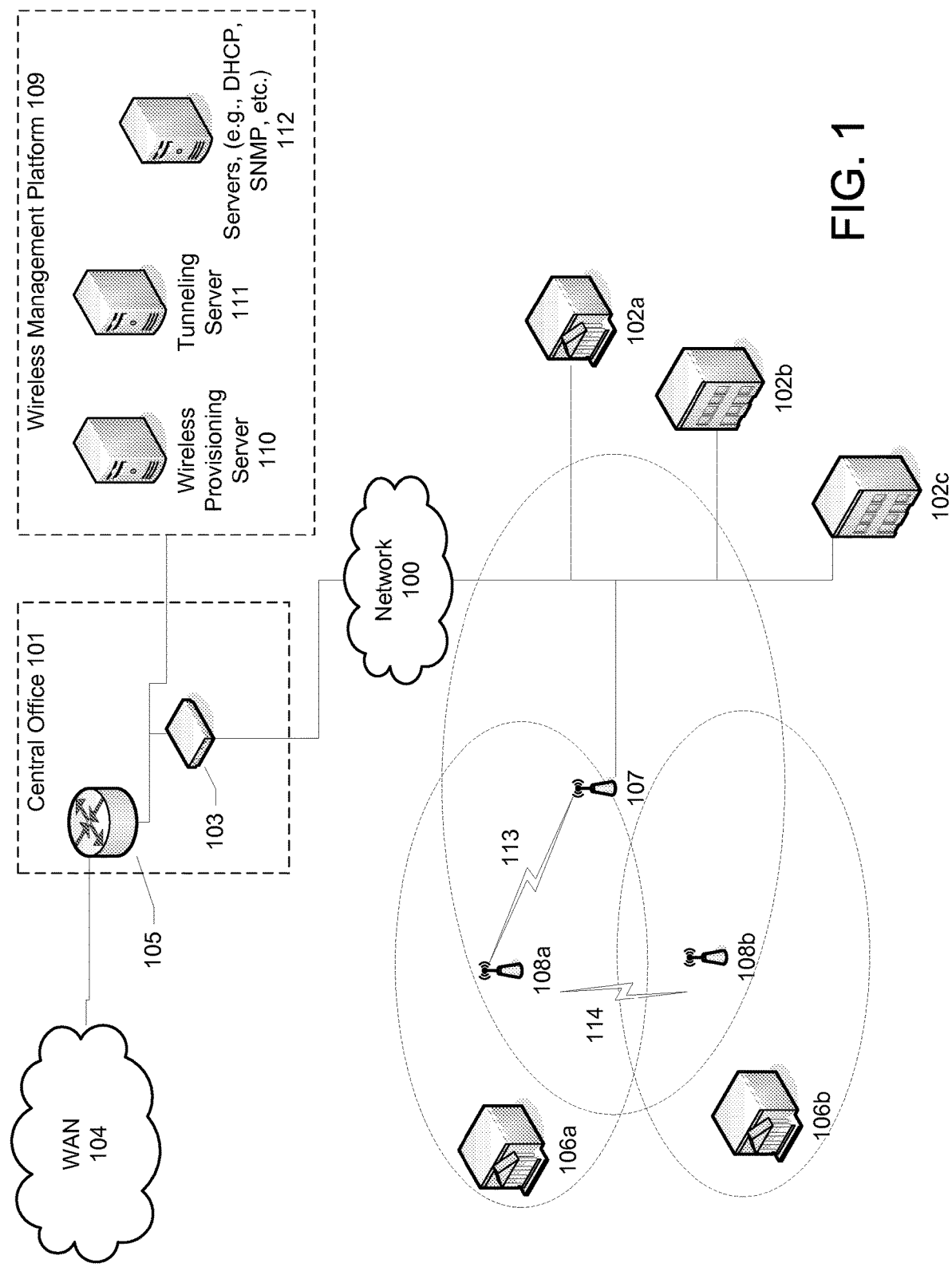
FIG. 1 illustrates an example system on which various features described herein may be implemented.

FIG. 1 illustrates an example communication system in which various features herein may be implemented. The system may include, for example, one or more information distribution networks 100. The network 100 may be any type of data or content distribution network, employing any type or combination of communication links. For example, the network 100 may be a wireless, fiber optic, coaxial cable and/or hybrid fiber/coax (HFC) network of cables, wires and wireless communication links, connecting a central office 101 (e.g., a headend) and a plurality of premises 102a-d (e.g., homes). Elements 102a-d may also represent neighborhoods of city blocks, streets, zones, etc., business establishments, etc. At each premise or neighborhood 102a-d, there may be a network access device (e.g., coaxial cable modem, fiber termination node, wireless node, telephone network interface unit, etc.), which may communicate over the network 100 with a matching device 103 at the central office 101. That central office matching device 103 may be, for example, a termination server (e.g., a Data Over Cable Service Interface Specification Cable Modem Termination Server—DOCSIS CMTS in an HFC type network).

The various premises 102a-c may use their connection to the network 100 to access each other, the central office 101, and any other servers over any other wide area network 104. The wide area network 104 may be, for example, any network of Internet Protocol devices, a telephone network, satellite network, fiber optic network, a local WiFi network (e.g., WiMAX), cellular telephone, etc., and may use a gateway access router 105. The router 105 can be, for example, any gateway computing device with an interface to the WAN 104 (e.g., an Internet gateway). The WAN 104 can also include local connection types, such as Ethernet, Firewire, etc.

Users at premises 102*a-c* may happily use their premises' network connections to access the network 100, but other premises 106*a-b* might be too far away from the network 100's wires to be connected. To extend the network 100's reach to those premises, the system may include one or more wireless nodes, such as primary node 107 and secondary nodes 108*a-b*.

The primary node 107 may be a strand-mounted wireless access node, having a network access interface similar to those at premises 102*a-c* (e.g., a modem, network interface unit, etc.) to connect to the network 100. Additionally, the primary node 107 may have wireless circuitry to wirelessly communicate with other devices, and may allow those devices to access the network 100 through the node 107's own network access interface. The wireless circuitry can include any desired wireless type, such as IEEE 802.11 or 802.16 compliant circuitry, and can be configured to use any desired portion of the electromagnetic spectrum (e.g., licensed and/or unlicensed portions of the spectrum) to allow wireless access to the network 100 by far away premises 106*a-b*. In FIG. 1, each wireless node 107/108 is illustrated with a range of coverage, and the overlapping ranges allow wireless extension of wireless network coverage.

The secondary nodes 108*a-b* may contain similar wireless circuitry as in the primary node 107, but may omit the wired network access interface for connecting to network 100. Instead of directly connecting to network 100, these secondary nodes 108*a-b* may wirelessly connect to the primary node 107, and use node 107 to eventually connect to network 100. The secondary nodes 108*a-b* may also include wireless circuitry to connect to various pieces of consumer premises equipment (CPE). Those CPEs may connect to the secondary node 108, which in turn may connect to the primary node 107, which in turn may connect to the network 100, and by virtue of these connections the CPEs can gain access to the network 100.

The primary and secondary nodes 107/108 may form a wireless mesh network, consolidating the wireless access so that the various wireless access points 107/108 may have common characteristics (e.g., SSIDs, profile configurations, etc.) to simplify their use. The nodes within the mesh (e.g., 107/108) may communicate with one another so that, for example, if the link between nodes 108*a* and 107 becomes unusable due to interference, node 108*a* can transmit its data to node 108*b*, and node 108*b* may forward it on to node 107. In some embodiments, these nodes may support multiple wireless mesh networks, each having different protocols and/or identifiers (e.g., SSIDs). One mesh network may be used to create a wireless backhaul link (e.g., a communication link that can be used to carry signals back to a central office or other server) to connect the nodes 107/108 to one another, while the other may be used to connect user devices and CPEs to the nodes (107/108). For example, a higher bandwidth wireless format may be used for the backhaul links, and a lower bandwidth format may be used for the CPE devices, since the backhaul links will be carrying more data traffic. In some embodiments, the backhaul links may be implemented as direct point-to-point network connections, instead of a mesh.

To coordinate the various wireless nodes and networks, the network 100 may include a wireless management platform 109 that generally manages the various wireless networks for the various premises or neighborhoods serviced by nodes 107/108. The platform 109 may be co-located with the central office 101, or it may be wired or wirelessly connected via a local or wide area network. The platform 109 itself may include one or more computer servers, configured to perform the various functions described herein. One server may be the wireless provisioning server 110. The wireless provisioning server 110 may be responsible for managing the allocation of Internet Protocol (IP) addresses to wireless devices coming on the network, and for managing those networks (as will be described below). The platform 109 may also include one or more tunneling servers 111. The tunneling servers 111 may be configured to terminate and administer secure communication tunnels or links with various devices on the network 100. For example, the server 111 may be a Layer 2 Tunneling Protocol (L2TP) termination server, configured to establish an L2TP secure tunnel with the primary node 107. Any desired type of secure communication server can be used.

The platform 109 may also include other servers 112, which can be configured to assist with DHCP IP address assignments, domain name lookup operations, etc. The various servers are illustrated separately for convenience, but in practice they may be combined/subdivided in any desired manner. The description herein may generally attribute the various server functions to the wireless management platform 109 as a whole, but the ultimate responsibilities may be divided and shared among the plurality of servers.

Figure 2:
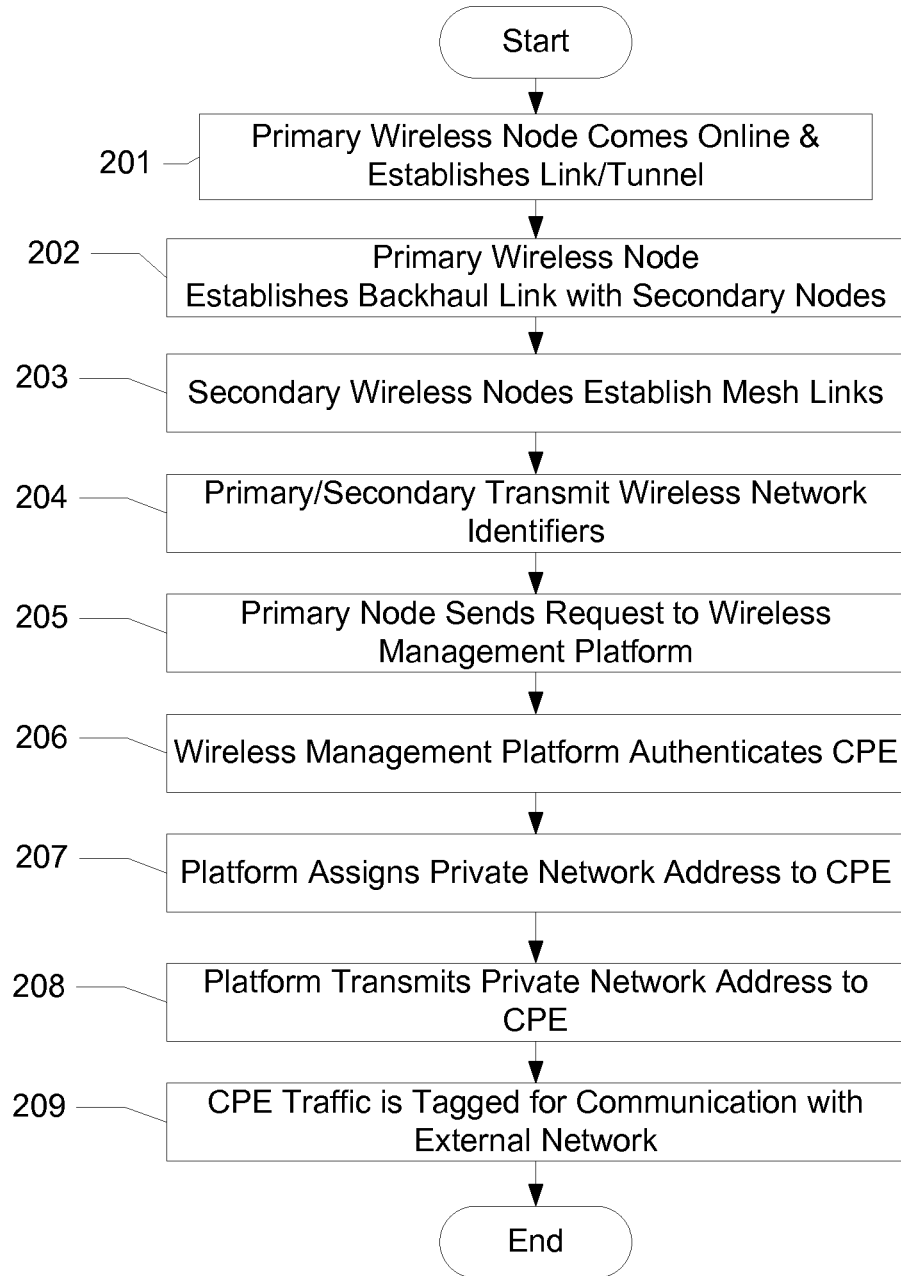
FIG. 2 illustrates an example process for extending the range of a broadband network.

FIG. 2 illustrates an example flow diagram for extending the broadband access of network 100. The example process in FIG. 2 begins with a primary wireless node (e.g., 107 in this example) coming online in step 201. As noted above, the primary node 107 may have a direct connection to the network 100, such as through a modem or other network interface device (e.g., DOCSIS, fiber, Ethernet, etc.), and may also have wireless circuitry. When the primary node 107 comes online (e.g., initially connected, powered on, etc.), it can establish a communication link with the network 100, such as, in an example of an HFC-type network, by establishing a DOCSIS connection via a matching device, such as a CMTS 103. First-time modems may undergo a more detailed provisioning process with the CMTS, which may include providing modem identification information (e.g., a media access control—MAC-address), and user authentication.

As part of coming online, the primary node 107 (or a CPE within the node 107) may be assigned an Internet Protocol address by the provisioning server 110 (which may use a DHCP server as well for this). The primary node 107's IP address may be a private one managed by the wireless provisioning server 110. For example, the server 110 may, through the gateway 105, have a single public IP address that is registered with domain name servers out on the WAN 104 (e.g., the Internet), and it can manage (or create) a listing of private IP addresses. The private IP addresses might not be registered on servers out on the WAN 104, but rather may be addresses that are assigned by the provisioning server 110 for use within the wireless network managed by the wireless management platform 109.

The primary node 107 (or, a CPE within the node 107) may also establish a secure tunnel for communications with the tunneling server 111. As noted above, this may be any desired type of secure communications link, such as a Layer 2 Tunneling Protocol (L2TP) tunnel. With the tunnel in place, the primary node 107 may securely communicate with the tunneling server, and the other devices of the wireless management platform.

Once the primary node 107 is up and running on the network 100, the primary node 107 may then establish a wireless backhaul link 113 with one or more secondary wireless extension nodes 108*a-b* in step 202. This link can be made using any desired wireless technology and any desired wireless format. So, for example, licensed or unlicensed spectrum ranges may be used, and formats may be, for example, IEEE 802.11 or 802.16 (among others). The secondary nodes 108*a-b* may use this backhaul wireless link to communicate with the primary node 107 and ultimately access the network 100. In some embodiments, the backhaul link 113 may include wired portions as well.

In step 203, the various secondary nodes 108*a-b* may also establish wireless mesh links 114 with one another. The mesh links 114 may be in the same type/format/protocol as the wireless backhaul links created in step 202, and may allow any of the nodes 107/108 to communicate with one another as a mesh network. The mesh network permits rerouting of signaling in case any particular wireless link becomes unusable (e.g., due to interference). For example, if the wireless link between nodes 108*a* and 107 is unusable due to interference, the nodes may use node 108*b* as an intermediary, passing signals to each other via node 108*b*.

In step 204, once the mesh network is up and running, the various wireless nodes 107/108 may transmit, e.g. broadcast, their wireless network identifiers (e.g., wireless SSIDs), and may begin receiving connection requests from various pieces of customer premises equipment (CPEs, such as portable laptops, computers, display devices, mobile phones, personal data assistants, etc.). In some embodiments, the nodes may broadcast different network identifiers to support multiple different types of wireless networks. For example, node 108*a* may broadcast one identifier (e.g., "Comcast_Wireless") intended for use by customers of one service, and another identifier (e.g., "Starbucks_Network") intended for use by customers of another service, and may support the two different types of wireless network concurrently. Different CPEs may log in to different wireless networks, depending on their own configuration and service subscription level.

If the CPE connected to a secondary wireless node 108, then the secondary node 108 may use the backhaul wireless connection to transmit the connection request to the primary access node 107. The primary node 107 may, in step 205, place this request onto the upstream transmission portion of network 100, and, for example, in the secure tunnel that was established with the wireless management platform 109. The primary node 107 may also do this for the CPEs that have directly connected to the node 107.

When sending the request to the wireless management platform 109, the primary node 107 may add a network identifier to the request, so that the request identifies the particular wireless network to which the CPE wishes to connect. For example, the different SSIDs ("Comcast_Wireless" and "Starbucks_Network") may correspond to different virtual network identifiers (e.g., a bit value of "0001" and "0010," respectively). The request may also include information identifying the CPE (e.g., a media access control unique address, serial number, model number, etc.), CPE user (e.g., a name, account number, etc.), and/or the node 107/108 to which the CPE is connected.

In step 206, the wireless management platform 109 may receive the request, decrypt/decode the data according to the appropriate tunneling protocol, and then authenticate the requesting CPE for the identified network. The authentication may involve, for example, comparing the information identifying the CPE, CPE's user, or wireless node 107/108 with a listing of authorized CPEs, users, or nodes for the particular network. For example, the platform 109 may store a list of approved identities for each network.

If the authentication fails, then the process may simply terminate with respect to that requesting CPE. However, if the authentication passes, then the platform 109 may assign a private network address (e.g., private IP address) to the requesting CPE in step 207, and transmit that private address to the CPE in step 208. The private address may be an address that is uniquely assigned to a single device in the wireless network of the nodes 107/108, or on network 100. This unique address need not be globally unique on the WAN 104, and may simply be unique within the network managed by platform 109. In contrast, a public address would be one that is uniquely assigned to a device on the WAN 104, such that messages addressed using the public address on the WAN 104 would be routable to a specific end point. So, for example, a packet sent to an WAN 104 server containing a public address destination would be routable to the eventual destination because the routers on the WAN 104 would know which device has that public address, but a packet containing a private address would not, because the routers on the WAN 104 (e.g., the Internet) do not associate the private address with any specific device.

From that point, the CPE may use its private network address to communicate on the wireless virtual network. Outgoing packets from the CPE can include the CPE's private network address as a sender address, and can be sent up through the tunnel to the wireless management platform 109. In the platform 109, an address translation server (e.g., within DHCP server 112) may repackage the outgoing packet with a different sender address, and may add payload information identifying the actual CPE that sent the packet. The different sender address used for this purpose can be a public network address that is routable on the WAN 104. That public network address can be, for example, an address assigned to a server within the management platform 109 that manages wireless communication for a particular virtual wireless network. For example, the "Comcast_Network" virtual wireless network may have its own server in the management platform 109, and that server may be responsible for translating or tagging upstream packets with its own public network address.

Incoming packets from the Internet may arrive at a virtual network's server using the server's public address, and the server may convert the public address into a private one based on additional identifying information contained in the incoming packet. The server can then prepare a new incoming packet, addressed to the CPE (or to the node 107/108) by its private network, and then transmit it downstream to the node 107/108 and CPE.

Figure 3:
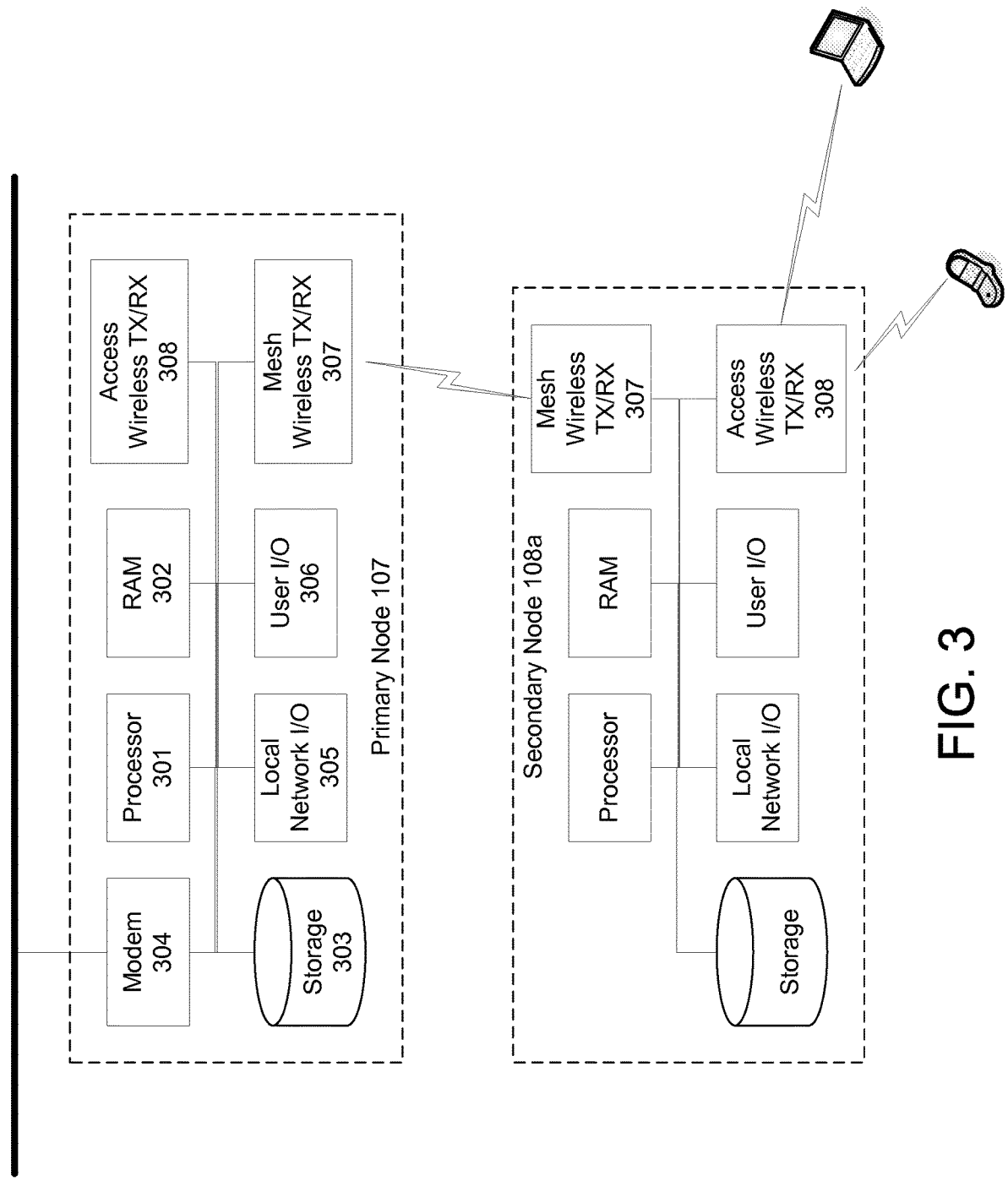
FIG. 3 illustrates internal components of an example primary and secondary wireless node, and associated computing devices.

The process in FIG. 3 concludes with this communication, although steps may be repeated as desired for the addition of new nodes and/or CPEs, and the process may continue with the termination or signing off of certain CPEs or nodes.

FIG. 3 illustrates internal components of an example primary node 107 and secondary node 108*a*. The primary node 107 may include, at its core, one or more processors 301. The processors 301 may execute instructions, stored in a computer-readable medium such as RAM 302 and storage 303, to cause the node to perform any of the steps and features described herein. The RAM 302 and storage 303 may be implemented using any desired type of computer-readable medium. For example, they can be flash, hard disks, floppy disks, optical compact disks, etc.

The primary node 107 may include a network interface device, such as a modem 304, which can be connected to the network 100. Other types of interfaces, such as fiber, Ethernet, WiMax, etc., may also be used.

The node 107 may also include local network input/output interfaces 305, to allow the node to connect to any additional desired type of communication network. For example, the node may include an Ethernet interface, a fire-wire (IEEE 1394) interface, Bluetooth, local wireless, etc.

The node may also include one or more user interface components 306. The user interface components 306 may be any desired type to allow interaction with users. For example, keyboards, mice, touch screens, microphones, speakers, etc. can be included.

The node may also include its mesh wireless transmission/reception radio circuitry 307. The mesh radio circuitry may be any desired type, such as IEEE 802.11 or 802.16, using licensed or unlicensed portions of the electromagnetic spectrum. As discussed above, the mesh radio may be used to form the point-to-point link between the primary node and one or more secondary nodes. The node may also include access radio circuitry 308. The access radio circuitry 308 may use similar wireless protocols as the mesh circuitry 307, or it may be different, and it may be used to connect with various CPEs in the range of the node.

The secondary node 108a, or access node, may contain many of the same types of elements as found in the primary node, such as one or more processors, storage media, interfaces, and mesh radio circuitry. The secondary node may also have, however, one or more access radio circuits 308. The access radio circuit 308 may contain wireless circuitry (e.g., IEEE 802.11) to communicate with any desired customer premise equipment (CPE) within range. As discussed above, this access radio allows those CPEs to access the network 100 via the mesh radio 307 and modem 304 of the primary node 107.

Although the FIG. 3 example components are illustrated in the context of an access node, the various servers, platforms, and other computing elements described above can be implemented using similar arrangements of processors, memories, and network interfaces, with the processors executing instructions stored on the memories to result in the performance of any of the steps and features described herein.

The examples described above are merely that—examples. Various modifications can be made as desired as well, such as the addition and/or removal of elements, the combining and/or dividing of elements, and the rearranging of elements. The true scope of this patent should not be limited by these examples, but rather, the scopes of each of the following claims.

What is claimed is:

1. A method comprising:
    receiving, by a first wireless access node, from a first device, and via a first wireless network, a first packet;
    receiving, by the first wireless access node, from a second device, and via a second wireless network, a second packet;
    sending, to a remote server and by the first wireless access node, the first packet and the second packet;
    receiving, by the first wireless access node and from the remote server, first information that instructs the first wireless access node to use a first network address to establish communications between the first wireless access node and the first device within the first wireless network, wherein the remote server manages a first list of network addresses to identify devices within the first wireless network, wherein the remote server manages a second list of network addresses to identify devices within the second wireless network, and wherein the first network address is unique to the first wireless network and not globally unique;
    receiving, by the first wireless access node and from the remote server, second information that instructs the first wireless access node to use a second network address to establish communications between the first wireless access node and the second device within the second wireless network, wherein the second network address is unique to the second wireless network and not globally unique;
    using, by the first wireless access node, the first network address to identify the first device within the first wireless network; and
    using, by the first wireless access node, the second network address to identify the second device within the second wireless network.

2. The method of claim 1, wherein one or more addresses in the first list are the same as one or more addresses in the second list.

3. The method of claim 1, wherein the first packet comprises a request for the first network address.

4. The method of claim 1, wherein the first list of network addresses is stored by the remote server, and wherein the second list of network addresses is stored by the remote server.

5. The method of claim 1, wherein the first packet and the second packet are sent via a second wireless access node.

6. The method of claim 1, wherein the second packet is received via a second wireless access node.

7. The method of claim 1, further comprising:
    establishing, by the first wireless access node, a wireless mesh network comprising the first wireless network and the second wireless network,
    wherein the second wireless network comprises a second wireless access node and the second packet is received via the mesh network.

8. The method of claim 7, wherein the wireless mesh network further comprises a third wireless access node, the method further comprising:
    based on a connection loss between the first wireless access node and the second wireless access node, establishing a connection between the first wireless access node and the second wireless access node via the third wireless access node.

9. The method of claim 1, wherein the first network address and the second network address are the same.

10. The method of claim 1, wherein sending the first packet and the second packet comprises:
    tagging the first packet with a Service Set Identifier (SSID) associated with the first wireless network.

11. The method of claim 1, further comprising:
    using, by the first wireless access node, the first network address to distinguish, on the first wireless network, the first device from other devices.

12. The method of claim 1, wherein the first network address comprises a private network address, of the first wireless network, selected from the first list.

13. The method of claim 1, wherein the first network address is used, by the first wireless access node, to identify the first device only within the first wireless network.

14. The method of claim 1, wherein the first list of network addresses is used, by the remote server, to assign addresses to devices connecting to the within the first wireless network.

15. The method of claim 14, wherein the first network address is an Internet Protocol (IP) address that uniquely identifies the first device during communications between the first device and the first wireless access node.

16. An apparatus comprising:
one or more processors; and
memory storing instructions that, when executed by the one or more processors, cause the apparatus to:
  receive, from a first device and via a first wireless network, a first packet;
  receive, from a second device and via a second wireless network, a second packet;
  send, to a remote server, the first packet and the second packet;
  receive, from the remote server, first information that instructs the apparatus to use a first network address to establish communications between the apparatus and the first device within the first wireless network, wherein the remote server manages a first list of network addresses to identify devices within the first wireless network, wherein the remote server manages a second list of network addresses to identify devices within the second wireless network, and wherein the first network address is unique to the first wireless network and not globally unique;
  receive, from the remote server, second information that instructs the apparatus to use a second network address to establish communications between the apparatus and the second device within the second wireless network, wherein the second network address is unique to the second wireless network and not globally unique;
  use the first network address to identify the first device within the first wireless network; and
  use the second network address to identify the second device within the second wireless network.

17. The apparatus of claim 16, wherein one or more addresses in the first list are the same as one or more corresponding addresses in the second list.

18. The apparatus of claim 16, wherein the first packet comprises a request for the first network address.

19. The apparatus of claim 16, wherein the first list of network addresses is used, by the remote server, to assign addresses to devices connecting to the within the first wireless network.

20. A system comprising:
a first wireless access node and a remote server;
wherein the first wireless access node comprises:
  one or more first processors; and
  first memory storing first instructions that, when executed by the one or more first processors, cause the first wireless access node to:
    receive, from a first device and via a first wireless network, a first packet;
    receive, from a second device and via a second wireless network, a second packet;
    send, to the remote server, the first packet and the second packet;
    receive, from the remote server, first information that instructs the first wireless access node to use a first network address to establish communications between the first wireless access node and the first device within the first wireless network, wherein the remote server manages a first list of network addresses to identify devices within the first wireless network, wherein the remote server manages a second list of network addresses to identify devices within the second wireless network, and wherein the first network address is unique to the first wireless network and not globally unique;
    receive, from the remote server, second information that instructs the first wireless access node to use a second network address to establish communications between the first wireless access node and the second device within the second wireless network, wherein the second network address is unique to the second wireless network and not globally unique;
    use the first network address to identify the first device within the first wireless network; and
    use the second network address to identify the second device within the second wireless network; and
wherein the remote server comprises:
  one or more second processors; and
  second memory storing second instructions that, when executed by the one or more second processors, cause the remote server to:
    receive, from the first wireless access node, the first packet and the second packet; and
    send, to the first wireless access node, the first information and the second information.

21. The system of claim 20, wherein one or more addresses in the first list are the same as one or more addresses in the second list.

* * * * *